(12) United States Patent
Yoshibata

(10) Patent No.: US 12,485,978 B2
(45) Date of Patent: Dec. 2, 2025

(54) TRAVELING UNIT, WORK MACHINE, TRACK SHOE PLATE, AND CRAWLER BELT

(71) Applicant: KOMATSU LTD., Tokyo (JP)

(72) Inventor: Tatsuya Yoshibata, Tokyo (JP)

(73) Assignee: KOMATSU LTD., Tokyo (JP)

( * ) Notice: Subject to any disclaimer, the term of this patent is extended or adjusted under 35 U.S.C. 154(b) by 598 days.

(21) Appl. No.: 17/915,741

(22) PCT Filed: Mar. 17, 2021

(86) PCT No.: PCT/JP2021/010826
§ 371 (c)(1),
(2) Date: Sep. 29, 2022

(87) PCT Pub. No.: WO2021/210330
PCT Pub. Date: Oct. 21, 2021

(65) Prior Publication Data
US 2023/0117077 A1    Apr. 20, 2023

(30) Foreign Application Priority Data
Apr. 16, 2020    (JP) .................. 2020-073717

(51) Int. Cl.
*B62D 55/28* (2006.01)
*B62D 55/06* (2006.01)
*B62D 55/21* (2006.01)

(52) U.S. Cl.
CPC ............. *B62D 55/28* (2013.01); *B62D 55/06* (2013.01); *B62D 55/21* (2013.01)

(58) Field of Classification Search
CPC ........ B62D 55/28; B62D 55/06; B62D 55/21; B62D 55/275; B62D 55/088; B60Y 2200/25
See application file for complete search history.

(56) References Cited

U.S. PATENT DOCUMENTS 2,964,361 A * 12/1960 Hansen .................. B62D 55/28
305/191
3,071,417 A * 1/1963 Militana ................ B62D 55/28
305/191
(Continued)

FOREIGN PATENT DOCUMENTS

CA    2808924 A1 * 3/2013 ............. B62D 55/06
CH    477318 A    8/1969
(Continued)

OTHER PUBLICATIONS

Machine translation of First Office Action mailed Feb. 26, 2024 in CN Application No. 2021800227441, 7 pages.

*Primary Examiner* — Drew J Brown
(74) *Attorney, Agent, or Firm* — Faegre Drinker Biddle & Reath LLP

(57) ABSTRACT

A crawler belt is wound around a sprocket and an idler and includes a plurality of track shoe plates. Each track shoe plate has an attachment surface and a ground engaging surface. The track shoe plate has projecting sections on the ground engaging surface. Side surfaces of the projecting sections are each inclined relative to a perpendicular line perpendicular to the attachment surface at an angle greater than a winding angle of the track shoe plate relative to either sprocket or idler.

10 Claims, 9 Drawing Sheets

(56) References Cited

U.S. PATENT DOCUMENTS

| | | | |
|---|---|---|---|
| 3,623,779 A | 11/1971 | Schmidt, Jr. | |
| 3,802,751 A | 4/1974 | Beyers | |
| 4,026,608 A | 5/1977 | Becker et al. | |
| 6,125,956 A * | 10/2000 | Gignac | B62D 55/06 |
| | | | 180/9.1 |
| 10,449,599 B2 * | 10/2019 | Wang | B21J 5/027 |
| 2003/0090151 A1 * | 5/2003 | Takeno | B62D 55/21 |
| | | | 305/185 |
| 2005/0040708 A1 * | 2/2005 | Yamamoto | B62D 55/21 |
| | | | 305/202 |
| 2009/0267408 A1 | 10/2009 | Chiang | |
| 2014/0001827 A1 | 1/2014 | Kaufmann et al. | |
| 2014/0246899 A1 | 9/2014 | Park | |
| 2014/0292068 A1 | 10/2014 | Hisamatsu et al. | |
| 2018/0281879 A1 | 10/2018 | Sho et al. | |

FOREIGN PATENT DOCUMENTS

| | | | | |
|---|---|---|---|---|
| CN | 86107278 A | * | 6/1987 | B62D 55/28 |
| CN | 201670288 U | | 12/2010 | |
| CN | 203318552 U | | 12/2013 | |
| CN | 103874622 A | | 6/2014 | |
| CN | 103974877 A | | 8/2014 | |
| CN | 104039637 A | * | 9/2014 | B62D 55/075 |
| CN | 104428198 A | | 3/2015 | |
| CN | 107614364 A | * | 1/2018 | B23K 9/04 |
| EP | 0091817 A2 | * | 10/1983 | |
| GB | 569586 A | * | 5/1945 | |
| JP | S50-87638 U | | 7/1975 | |
| JP | S52-54531 U | | 4/1977 | |
| JP | S52-69128 A | | 6/1977 | |
| JP | S52-69129 A | | 6/1977 | |
| JP | S53-90342 U | | 7/1978 | |
| JP | S57-101681 U | | 6/1982 | |
| JP | S61-071581 U | | 5/1986 | |
| JP | S61-89183 A | | 5/1986 | |
| JP | H08-337185 A | | 12/1996 | |
| JP | 2001-260963 A | | 9/2001 | |
| JP | 2001-310776 A | | 11/2001 | |
| JP | 2002234470 A | * | 8/2002 | |
| JP | 2015-525702 A | | 9/2015 | |
| KR | 2010-0003563 A | | 1/2010 | |
| KR | 20140084428 A | * | 7/2014 | |
| RU | 2713332 C1 | | 2/2020 | |
| WO | WO-2014/004898 A1 | | 1/2014 | |
| WO | WO-2016153842 A1 | * | 9/2016 | B62D 55/205 |
| WO | WO-2017/068688 A1 | | 4/2017 | |

* cited by examiner

TRAVELING UNIT, WORK MACHINE, TRACK SHOE PLATE, AND CRAWLER BELT

TECHNICAL FIELD

The present disclosure relates to a traveling unit, a work machine, a track shoe plate, and a crawler belt.

BACKGROUND ART

For example, Japanese Patent Laying-Open No. 2001-260963 (PTL 1) discloses a track shoe plate capable of easily removing dirt adhering to a ground engaging surface of the track shoe plate. In the track shoe plate disclosed in PTL 1, a plurality of projecting sections provided on the ground engaging surface are connected by an arc section. PTL 1 discloses that even when dirt adheres to the arc section, applying a force to the dirt using a rod, cleaning water, or the like allows the dirt to easily separate from the track shoe plate by virtue of the shape of the arc section.

CITATION LIST

Patent Literature

PTL 1: Japanese Patent Laying-Open No. 2001-260963

SUMMARY OF INVENTION

Technical Problem

Work machines such as hydraulic excavators are generally rented out by rental/leasing agents. Such a rental/leasing agent cleans a work machine before renting out the work machine again. In the technique disclosed in PTL 1, it is necessary to apply a force to dirt adhering to a track shoe plate using a rod, cleaning water, or the like to clean the track shoe plate. For this reason, there is a demand for reducing labor of removing dirt and the like adhering to the track shoe plate.

It is therefore an object of the present disclosure to provide a traveling unit, a work machine, a track shoe plate, and a crawler belt that make it difficult for dirt adhere to the track shoe plate.

Solution to Problem

A traveling unit according to the present disclosure includes a driving wheel, an idler wheel, and a crawler belt. The crawler belt is wound around the driving wheel and the idler wheel and includes a plurality of track shoe plates. Each track shoe plate has a first surface and a second surface located on a side opposite to the driving wheel and the idler wheel relative to the first surface. The track shoe plate has a first projecting section on the second surface. A first side surface of the first projecting section is inclined relative to a perpendicular line perpendicular the first surface at an angle greater than a winding angle of the track shoe plate relative to either the driving wheel or the idler wheel.

The angle greater than the winding angle of the track shoe plate relative to either the driving wheel or the idler wheel means an angle greater than either a winding angle of the track shoe plate relative to the driving wheel or a winding angle of the track shoe plate relative to the idler wheel.

A track shoe plate according to the present disclosure includes a first surface and a second surface. The second surface is located on a side opposite to the first surface and has a projecting section. The projecting section has a first side surface and a second side surface located on a side opposite to the first side surface. The first side surface is inclined relative to a perpendicular line perpendicular to the first surface more than the second side surface. The first side surface has a first inclined surface extending linearly and a second inclined surface connected to an end, closer to the first surface, of the first inclined surface and extending in a curved shape in a side view.

Another track shoe plate according to the present disclosure includes a first surface and a second surface. The second surface is located on a side opposite to the first surface. The second surface has a first projecting section and a second projecting section. A side surface, closer to the second projecting section, of the first projecting section has a curve extending from a distal end of the first projecting section toward the first surface in a side view, the curve being curved outward away from the first surface.

Advantageous Effects of Invention

According to the present disclosure, it is possible to provide the traveling unit, the work machine, the track shoe plate, and the crawler belt that make it difficult for dirt to adhere to the track shoe plate.

DESCRIPTION OF EMBODIMENTS

Figure 1:
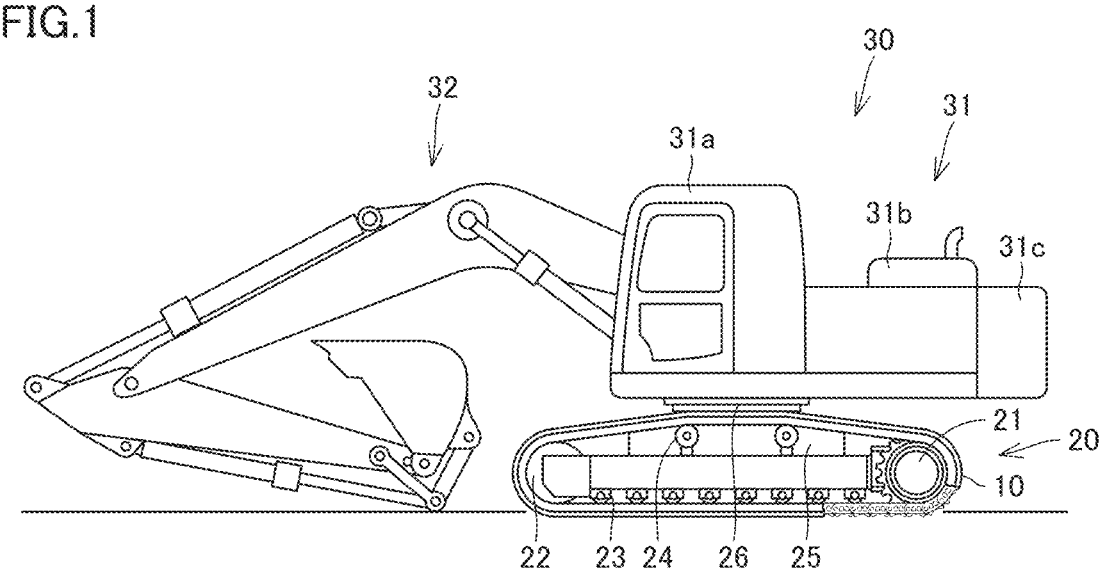
FIG. 1 is a side view of a structure of a hydraulic excavator as an example of a track-type work machine according to a first embodiment of the present disclosure.

Hereinafter, embodiments of the present disclosure will be described in detail with reference to the drawings.

Note that, in the specification and the drawings, the same components or corresponding components are denoted by the same reference numerals to avoid the description from being redundant. Further, in the drawings, a structure may be omitted or simplified for convenience of description. Further, at least some of the embodiments may be combined with each other as needed.

First Embodiment

<Structure of Track-Type Work Machine>

A structure of a hydraulic excavator will be described with reference to FIG. 1 as an example of a track-type work machine to which the idea of the present disclosure is applicable. Note that the present disclosure is also applicable to a track-type work machine such as a crawler dozer other than the following hydraulic excavator.

FIG. 1 is a side view of a structure of a hydraulic excavator as an example of a track-type work machine according to a first embodiment of the present disclosure. As illustrated in FIG. 1, a track-type work machine (for example, a hydraulic excavator) 30 mainly includes a traveling unit 20, a turning body 31 (machine main body), and a work implement 32.

Turning body 31 includes a cab 31a on a front left side (vehicle front side) of turning body 31, and an engine compartment 31b accommodating an engine, a counterweight 31c, and the like on a rear side (vehicle rear side) of turning body 31. Here, the front, rear, left, and right of the vehicle are determined relative to an operator seated in cab 31a.

Work implement 32 is pivotally supported on a front side of turning body 31, and includes, for example, a boom, an arm, a bucket, and a hydraulic cylinder.

Traveling unit 20 supports turning body 31. Turning body 31 freely turns relative to traveling unit 20. Traveling unit 20 allows track-type work machine 30 to be self-propelled. Traveling unit 20 mainly includes a crawler belt 10, a sprocket 21 (driving wheel), an idler 22 (idler wheel), a bottom roller 23, a top roller 24, a track frame 25, and a turning apparatus 26.

Turning apparatus 26 is mounted on track frame 25. Turning apparatus 26 is turnable relative to track frame 25. Turning body 31 is mounted on turning apparatus 26. This enables turning body 31 to turn relative to traveling unit 20.

Sprocket 21, idler 22, a plurality of bottom rollers 23, and a plurality of top rollers 24 are attached to each side of track frame 25. Sprocket 21 is provided at, for example, a rear end of track frame 25 so as to be driven to rotate. Idler 22 is provided at, for example, a front end of track frame 25 in a rotatable manner. The plurality of bottom rollers 23 are provided on a lower side of track frame 25 in a rotatable manner. The plurality of top rollers 24 are provided on an upper side of track frame 25 in a rotatable manner.

Crawler belt 10 is disposed on each side of track frame 25. Crawler belt 10 is an endless belt (loop belt), and is wound around sprocket 21 and idler 22. Crawler belt 10 is supported by the plurality of bottom rollers 23 and the plurality of top rollers 24 arranged between sprocket 21 and idler 22.

Crawler belt 10 is engaged with sprocket 21. Crawler belt 10 can be driven by rotation of driving sprocket 21 to rotate. When crawler belt 10 is driven to rotate, idler 22, the plurality of bottom rollers 23, and the plurality of top rollers 24 that are in contact with crawler belt 10 can rotate.

Figure 2:
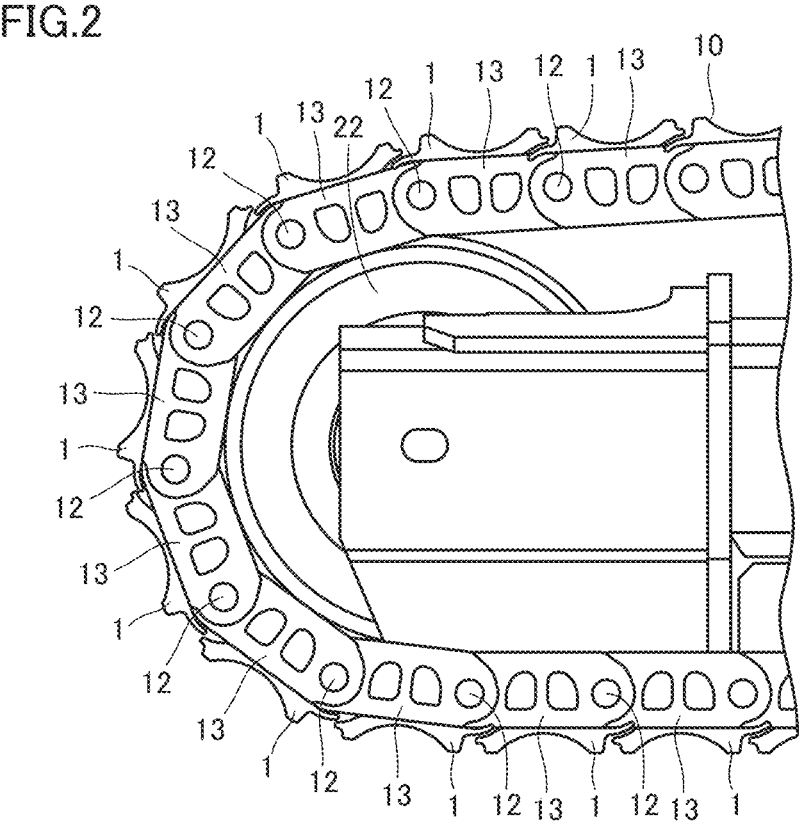
FIG. 2 is a partially enlarged view of a structure around an idler of the track-type work machine illustrated in FIG. 1.

As illustrated in FIG. 2, crawler belt 10 includes a plurality of track shoe plates (shoes) 1, a plurality of crawler belt links 13, and a plurality of coupling pins 12. Each of the plurality of track shoe plates 1 is attached to a corresponding one of the plurality of crawler belt links 13. The plurality of crawler belt links 13 are coupled into an endless loop by coupling pins 12.

With crawler belt 10 wound around sprocket 21 and idler 22, track shoe plate 1 is disposed on a side of crawler belt link 13 on a side opposite to sprocket 21 and idler 22.

<Structure of Crawler Belt>

Next, a structure of crawler belt 10 will be described with reference to FIG. 3.

Figure 3:
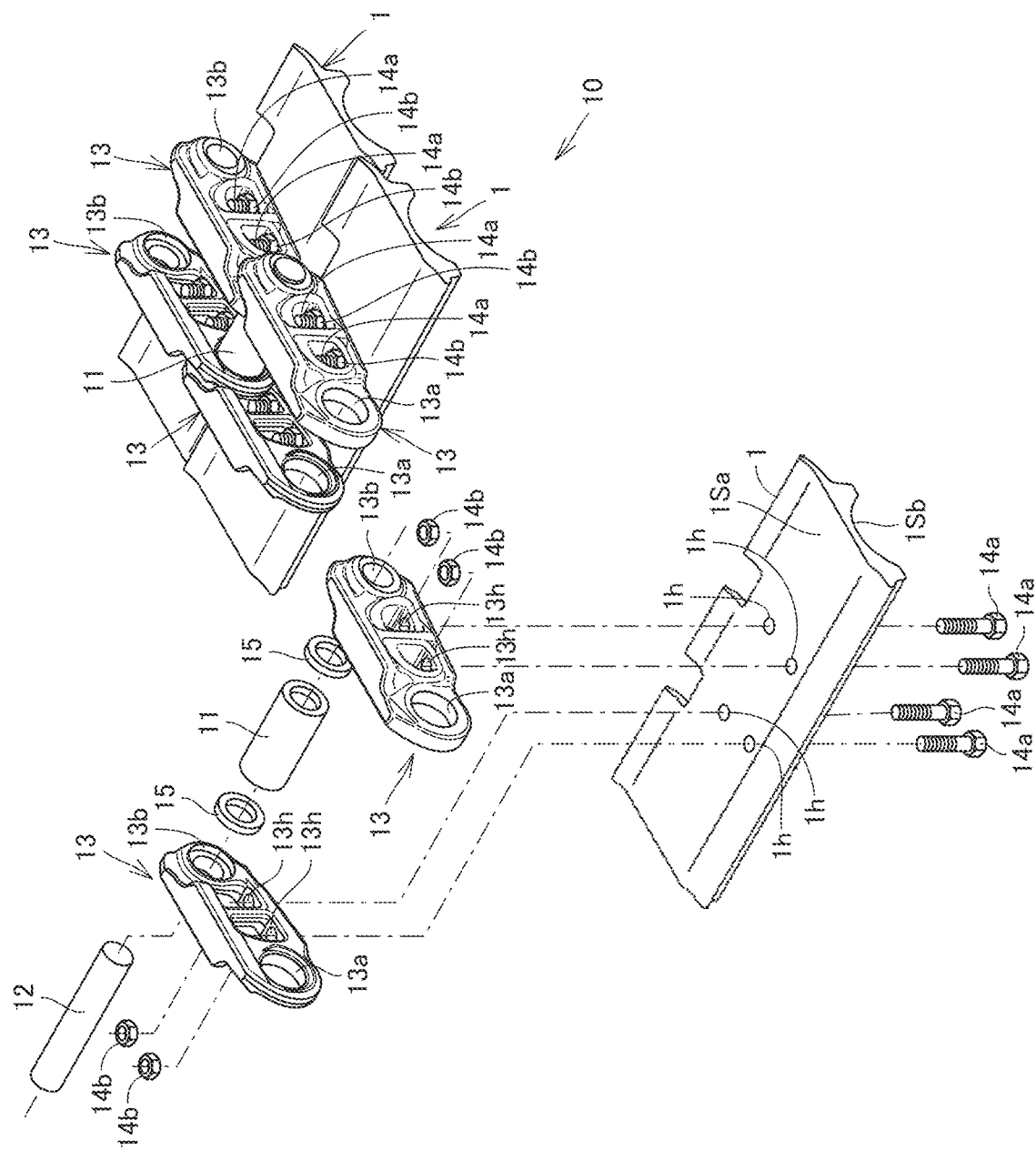
FIG. 3 is an exploded perspective view of a structure of a crawler belt of the track-type work machine illustrated in FIG. 1.

FIG. 3 is an exploded perspective view of the structure of the crawler belt of the track-type work machine illustrated in FIG. 1. As illustrated in FIG. 3, crawler belt 10 further includes a bushing 11, track shoe plate attachment members 14a, 14b, and a seal member 15.

Track shoe plate 1 has an attachment surface 1Sa (first surface) and a ground engaging surface 1Sb (second surface) located on a side opposite to attachment surface 1Sa. Attachment surface 1Sa is a surface where crawler belt link 13 is attached to track shoe plate 1. Ground engaging surface 1Sb is a surface that comes into contact with the ground during traveling. Ground engaging surface 1Sb is located on a side opposite to sprocket 21 and idler 22 relative to attachment surface 1Sa with crawler belt 10 wound around sprocket 21 and idler 22. Track shoe plate 1 has a plurality of through holes 1h passing through from attachment surface 1Sa to ground engaging surface 1Sb.

Crawler belt link 13 is disposed on attachment surface 1Sa of track shoe plate 1. Crawler belt link 13 includes a bushing hole 13a, a pin hole 13b, and a through hole 13h. Track shoe plate 1 is attached to crawler belt link 13 by track shoe plate attachment members 14a, 14b. As track shoe plate attachment members 14a, 14b, for example, a bolt member 14a and a nut member 14b are used.

Bolt member 14a is inserted into through hole 1h of track shoe plate 1 and through hole 13h of crawler belt link 13 from ground engaging surface 1Sb. In this state, bolt member 14a is screwed into nut member 14b on the crawler belt link 13. This causes crawler belt link 13 to be attached to attachment surface 1Sa of track shoe plate 1.

Two crawler belt links 13 are attached to one track shoe plate 1. On one crawler belt 10, the plurality of crawler belt links 13 are arranged in two rows. Crawler belt links 13 adjacent to each other in the same row (a first crawler belt link 13 and a second crawler belt link 13) are coupled to each other by coupling pin 12.

Bushing hole 13a of first crawler belt link 13 and pin hole 13b of second crawler belt link 13 are disposed concentrically. Bushing 11 having a cylindrical shape is press-fitted into bushing hole 13a of first crawler belt link 13. Seal member 15 is disposed between each end of bushing 11 and second crawler belt link 13. Coupling pin 12 is inserted into bushing 11. Coupling pin 12 is press-fitted into pin hole 13b of second crawler belt link 13. As a result, first and second crawler belt links 13 arranged in the same row are coupled to each other.

Further, crawler belt link 13 in one of the two rows is disposed closer to one end of bushing 11 and one end of coupling pin 12. Crawler belt link 13 in the other of the two rows is disposed closer to the other end of bushing 11 and the other end of coupling pin 12. As a result, crawler belt link 13 in the one row and crawler belt link 13 in the other row are coupled to each other.

<Structure of Track Shoe Plate>

Next, a structure of track shoe plate 1 will be described with reference to FIGS. 4 and 5.

Figure 4:
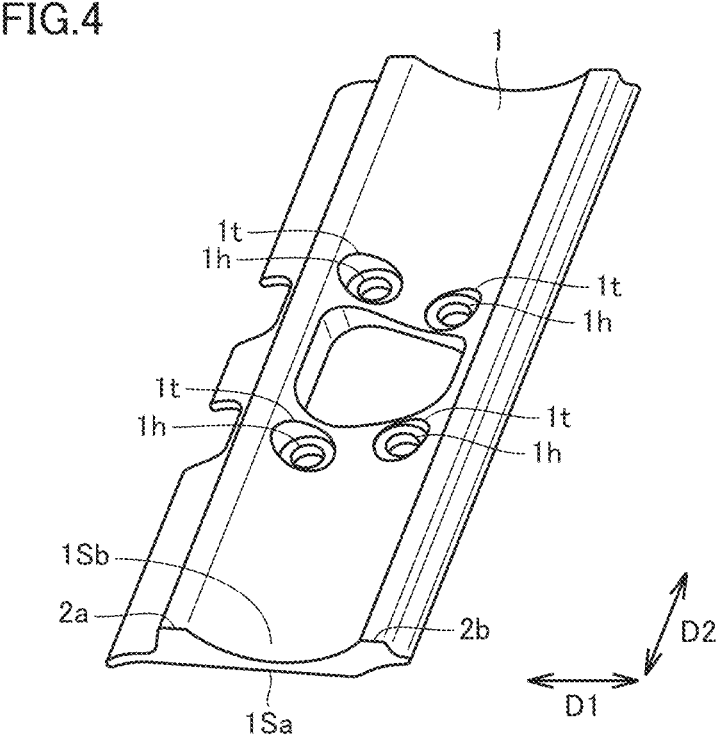
FIG. 4 is a perspective view of a structure of a track shoe plate of the track-type work machine illustrated in FIG. 1.

FIG. 4 is a perspective view of the structure of the track shoe plate of the track-type work machine illustrated in FIG. 1. FIG. 5 is a side view of the structure of the track shoe plate illustrated in FIG. 4. As illustrated in FIG. 4, attachment surface 1Sa of track shoe plate 1 has, for example, a flat surface section. Track shoe plate 1 has a plurality of projecting sections (grousers) 2a, 2b on ground engaging surface 1Sb. The plurality of projecting sections 2a, 2b are two projecting sections including projecting section 2a and projecting section 2b, for example. Note that the plurality of projecting sections may be three or more projecting sections.

Each of the plurality of projecting sections 2a, 2b extends in a crossing direction D2. Crossing direction D2 is a direction crossing (for example, orthogonal to) a travel direction D1 of crawler belt 10 when track-type work machine 30 travels. Each of the plurality of projecting sections 2a, 2b continuously and uninterruptedly extends from one end to the other of track shoe plate 1 in crossing direction D2. The plurality of projecting sections 2a, 2b extend in parallel to each other, for example.

The plurality of through holes 1h are disposed between projecting section 2a and projecting section 2b. In ground engaging surface 1Sb, a depression 1t is provided near (for example, around) each of the plurality of through holes 1h. Depression 1t is a section in which a head of bolt member 14a is placed.

Figure 5:
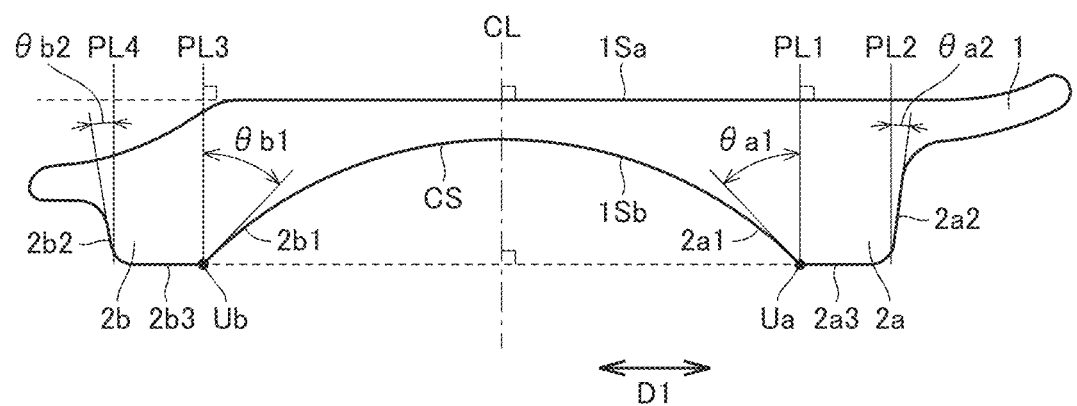
FIG. 5 is a side view of the structure of the track shoe plate illustrated in FIG. 4.

As illustrated in FIG. 5, projecting section 2a has a side surface 2a1, a side surface 2a2, and a distal end surface 2a3. Side surface 2a2 is located on a side opposite to side surface 2a1. Distal end surface 2a3 is a distal end of projecting section 2a and is disposed between side surface 2a1 and side surface 2a2. Distal end surface 2a3 is parallel to the flat surface of attachment surface 1Sa, for example.

In a side view, side surface 2a1 is inclined relative to a perpendicular line PL1. Perpendicular line PL1 is a line perpendicular to the flat surface of attachment surface 1Sa and is a straight line passing through a distal end edge Ua of projecting section 2a. In the side view, side surface 2a2 is inclined relative to a perpendicular line PL2. Perpendicular line PL2 is a line perpendicular to the flat surface of attachment surface 1Sa and is a straight line passing through a distal end edge of projecting section 2a on a side opposite to distal end edge Ua. In the side view, side surface 2a1 and side surface 2a2 are inclined in opposite directions.

Herein, the side view means a viewpoint when viewing one of the pair of crawler belts 10 from the other side as illustrated in FIG. 1 or 2. Further, as illustrated in FIG. 4, the side view means a viewpoint when viewing track shoe plate 1 in crossing direction D2.

In the side view, side surface 2a1 is inclined so as to be gradually away from side surface 2a2 (or perpendicular line PL1) while extending from distal end surface 2a3 toward attachment surface 1Sa. In the side view, side surface 2a2 is inclined so as to be gradually away from side surface 2a1 (or perpendicular line PL2) while extending from distal end surface 2a3 toward attachment surface 1Sa. As a result, the dimension of projecting section 2a in travel direction D1 increases from distal end surface 2a3 toward attachment surface 1Sa.

In the side view, an inclination angle $\theta a1$ of side surface 2a1 relative to perpendicular line PL1 is greater than an inclination angle $\theta a2$ of side surface 2a2 relative to perpendicular line PL2.

Projecting section 2b has a side surface 2b1, a side surface 2b2, and a distal end surface 2b3. Side surface 2b2 is located on a side opposite to side surface 2b1. Distal end surface 2b3 is a distal end of projecting section 2b and is disposed between side surface 2b1 and side surface 2b2. Distal end surface 2b3 is parallel to the flat surface of attachment surface 1Sa, for example.

In the side view, side surface 2b1 is inclined relative to a perpendicular line PL3. Perpendicular line PL3 is a line perpendicular to the flat surface of attachment surface 1Sa and is a straight line passing through a distal end edge Ub of projecting section 2b. In the side view, side surface 2b2 is inclined from a perpendicular line PL4. Perpendicular line PL4 is a line perpendicular to the flat surface of attachment surface 1Sa and is a straight line passing through a distal end edge of projecting section 2b on a side opposite to distal end edge Ub. In the side view, side surface 2b1 and side surface 2b2 are inclined in opposite directions.

In the side view, side surface 2b1 is inclined so as to be gradually away from side surface 2b2 (or perpendicular line PL3) while extending from distal end surface 2b3 toward attachment surface 1Sa. In the side view, side surface 2b2 is inclined so as to be gradually away from side surface 2b1 (or perpendicular line PL4) while extending from distal end surface 2b3 toward attachment surface 1Sa. As a result, the dimension of projecting section 2b in travel direction D1 increases from distal end surface 2b3 toward attachment surface 1Sa.

In the side view, an inclination angle $\theta b1$ of side surface 2b1 relative to perpendicular line PL3 is greater than an inclination angle $\theta b2$ of side surface 2b2 relative to perpendicular line PL4.

Projecting section 2a and projecting section 2b are connected by a concave curved surface CS forming an arc. Specifically, concave curved surface CS forming an arc connects distal end edge Ua of projecting section 2a closer to projecting section 2b and distal end edge Ub of projecting section 2b closer to projecting section 2a. Concave curved surface CS is concave toward attachment surface 1Sa.

Inclination angle $\theta a1$ is an angle between a line tangent to curved surface CS forming an arc and perpendicular line PL1 at distal end edge Ua. Inclination angle $\theta b1$ is an angle between a line tangent to curved surface CS forming an arc and perpendicular line PL3 at distal end edge Ub.

Inclination angle $\theta a1$ and inclination angle $\theta b1$ are greater than a winding angle $\alpha$ of track shoe plate 1 relative to either sprocket 21 or idler 22. Here, the angle greater than winding angle $\alpha$ of track shoe plate 1 relative to either sprocket 21 or idler 22 means an angle greater than either a winding angle of track shoe plate 1 relative to sprocket 21 or a winding angle of track shoe plate 1 relative to idler 22.

The winding angle of track shoe plate 1 relative to idler 22 and the winding angle of track shoe plate 1 relative to sprocket 21 may be the same as or different from each other. Even when the winding angle of track shoe plate 1 relative to idler 22 and the winding angle of track shoe plate 1 relative to sprocket 21 are different from each other, the winding angles are collectively referred to as winding angle $\alpha$ for convenience of description herein.

Winding angle α of track shoe plate 1 is obtained by the following equation.

Winding angle α of track shoe plate 1=(winding angle *A* of crawler belt 10 relative to idler 22 or sprocket 21)/(number of track shoe plates 1 wound around idler 22 or sprocket 21)

≈(winding angle *A*)/(arc length of crawler belt 10 wound around idler 22 or sprocket 21/length *L* of track shoe plate 1 in travel direction *D*1)

=(winding angle *A*)/[2×radius *r* of idler 22 or sprocket 21×π×(winding angle *A*/360)/length *L* of track shoe plate 1 in travel direction *D*1]

Radius r of idler 22 or sprocket 21 corresponds to a length of a perpendicular line drawn down from a rotation center C of idler 22 or sprocket 21 to attachment surface 1Sa (first surface) of track shoe plate 1. Length L of track shoe plate 1 in travel direction D1 corresponds to a length between coupling pins 12.

<Effects>

In the present embodiment, as illustrated in FIG. 5, inclination angle θa1 of side surface 2a1 of projecting section 2a is greater than winding angle α of track shoe plate 1 relative to either sprocket 21 or idler 22. Further, inclination angle θb1 of side surface 2b1 of projecting section 2b is greater than winding angle α of track shoe plate 1 relative to either sprocket 21 or idler 22. This makes it difficult for dirt to adhere to track shoe plate 1 and make it possible to reduce labor for removing dirt adhering to track shoe plate 1. This will be described below with reference to FIGS. 6 to 8.

Figure 6:
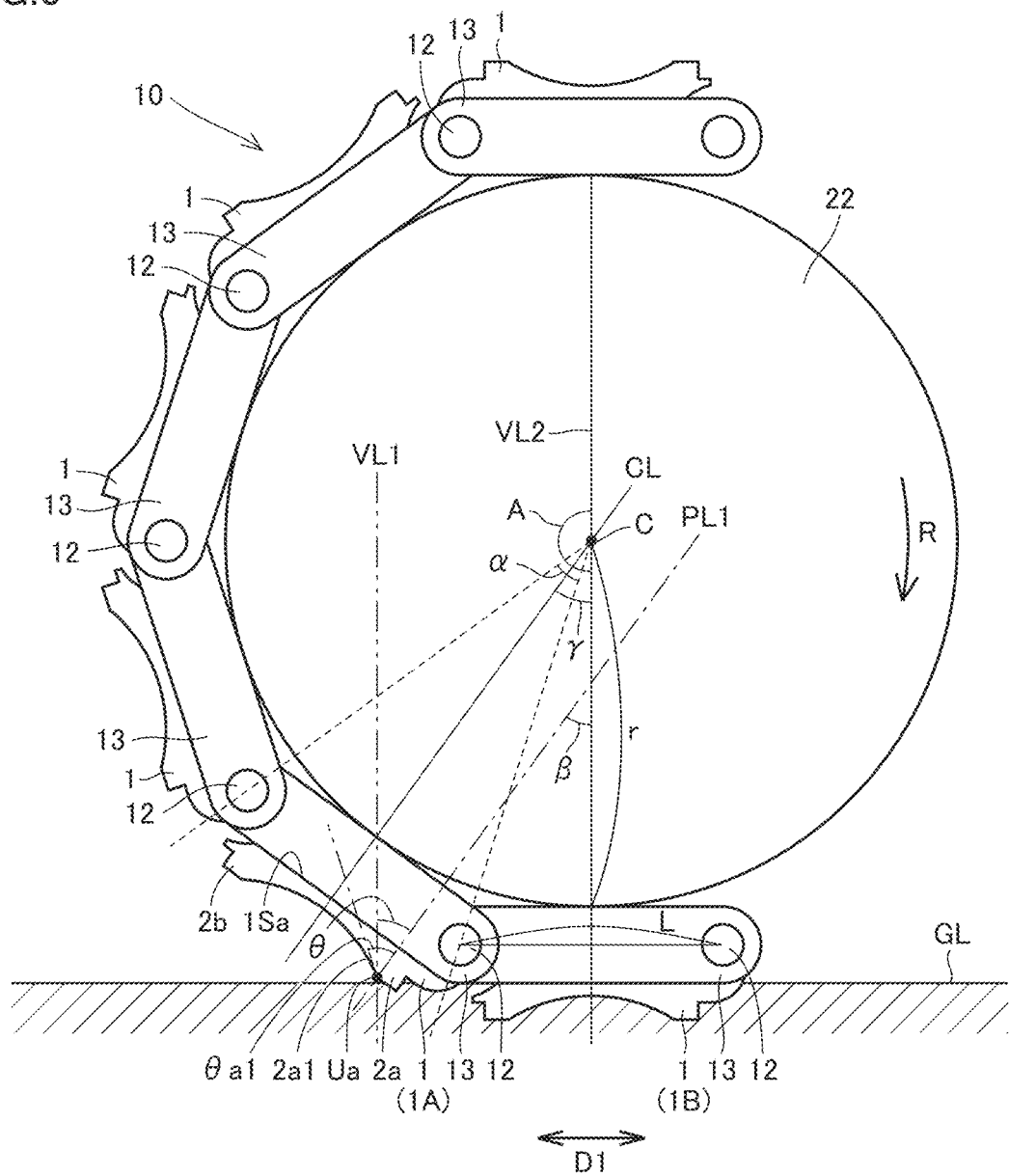
FIG. 6 is a conceptual diagram for describing a winding angle of the track shoe plate.
Figure 7:
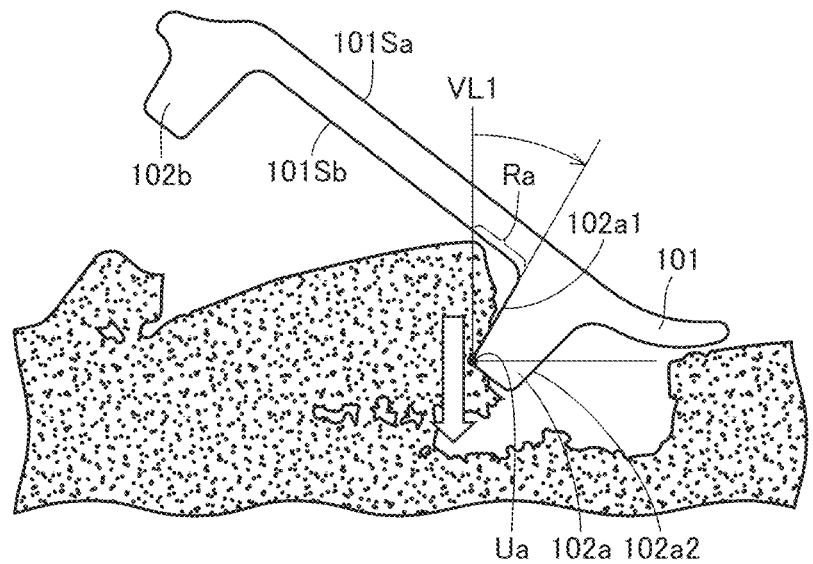
FIG. 7 is a side view of a track shoe plate according to a comparative example, for describing how easy it is for dirt to adhere to the track shoe plate.
Figure 8:
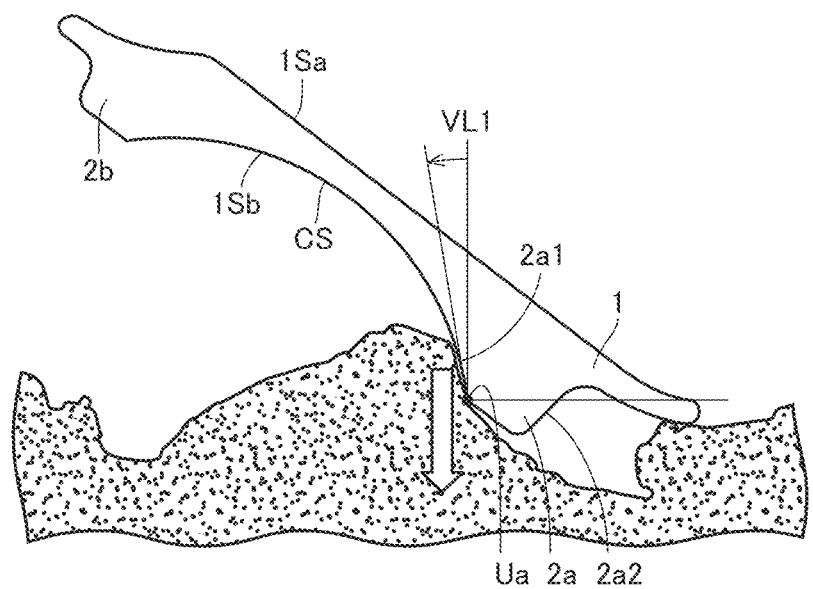
FIG. 8 is a side view of the track shoe plate illustrated in FIG. 4, for describing how difficult it is for dirt to adhere to the track shoe plate.

FIG. 6 is a conceptual diagram for describing the winding angle of the track shoe plate. FIG. 7 is a side view of a track shoe plate according to a comparative example, for describing how easy it is for dirt to adhere to the track shoe plate. FIG. 8 is a side view of the track shoe plate illustrated in FIG. 4, for describing how difficult it is for dirt to adhere to the track shoe plate.

Note that, in FIGS. 7 and 8, a region indicated by dots represents dirt. Further, in FIGS. 13 and 14 to be described later, a region indicated by dots represents dirt in the same manner.

As illustrated in FIG. 6, track-type work machine 30 is traveling on, for example, a horizontal ground GL. Crawler belt 10 is wound around idler 22 at winding angle A of, for example, 180°. Idler 22 rotates, for example, in a clockwise direction indicated by an arrow R. A track shoe plate 1B is in a state immediately before kicking up ground GL. A track shoe plate 1A is adjacent to track shoe plate 1B is in a state just after kicking up ground GL.

In the side view, an angle formed by centers of coupling pins 12 at both ends of track shoe plate 1A and rotation center C of idler 22 corresponds to winding angle α of track shoe plate 1A. A straight line CL that bisects winding angle α of track shoe plate 1A is a line perpendicular to the flat surface of attachment surface 1Sa of track shoe plate 1A.

Here, a straight line PL1 that is parallel to straight line CL and passes through distal end edge Ua of projecting section 2a of track shoe plate 1A is given. Further, a straight line VL1 that is a line perpendicular to ground GL (for example, a vertical line) and passes through distal end edge Ua of track shoe plate 1A is given. Further, a straight line VL2 that is a line perpendicular to ground GL (for example, a vertical line) and passes through rotation center C of idler 22 is given. Straight line VL2 is also a line perpendicular to the flat surface of attachment surface 1Sa of track shoe plate 1B.

Here, winding angle α is equal to an angle γ. Angle γ and an angle β are corresponding angles between two straight lines CL and PL1 parallel to each other. Thus, angle γ is equal to angle β. Angle β and an angle θ are alternate angles between two straight lines VL1 and VL2 parallel to each other. Thus, angle β is equal to angle θ. From the above, a relation of α=γ=β=θ holds. Therefore, angle θ formed by straight line PL1 and straight line VL1 is equal to winding angle α of track shoe plate 1A.

Therefore, when inclination angle θa1 of side surface 2a1 of track shoe plate 1A is greater than winding angle α (=θ), side surface 2a1 of track shoe plate 1A is inclined relative to straight line VL1 (for example, a vertical line). Side surface 2a1 of track shoe plate 1A is inclined relative to straight line VL1 (for example, a vertical line) so as to be closer to projecting section 2b while extending toward attachment surface 1Sa.

As illustrated in FIG. 7, it is assumed that a track shoe plate 101 according to the comparative example is in the same state as track shoe plate 1A illustrated in FIG. 6. In track shoe plate 101 according to the comparative example, a side surface 102a1 of a projecting section 102a is inclined relative to straight line VL1 so as to be gradually away from straight line VL1 (for example, a vertical line) toward a side surface 102a2 while extending toward an attachment surface 101Sa. This causes projecting section 102a2 to be positioned directly below a partial region Ra of a ground engaging surface 101Sb in the vertical direction. This makes it difficult for dirt to separate from a corner formed by side surface 102a1 and region Ra of ground engaging surface 101Sb, and dirt tends to remain on track shoe plate 101 accordingly.

On the other hand, in the present embodiment, as illustrated in FIG. 8, side surface 2a1 of track shoe plate 1 in the same state as track shoe plate 1A illustrated in FIG. 6 is inclined relative to straight line VL1 so as to be gradually away from straight line VL1 (for example, a vertical line) toward projecting section 2b while extending toward attachment surface 1Sa. This prevents projecting sections 2a, 2b from being positioned directly below all concave curved surface CS of ground engaging surface 1Sb in the vertical direction. This makes it easy for dirt to separate from concave curved surface CS and makes it difficult for dirt to remain on track shoe plate 1.

Further, in the present embodiment, as illustrated in FIG. 5, side surface 2b1 of projecting section 2b facing projecting section 2a is inclined relative to perpendicular line PL3 at an angle greater than winding angle α of track shoe plate 1 relative to either sprocket 21 or idler 22. This makes it difficult for dirt to remain on track shoe plate 1 regardless of whether work machine 30 travels either forward or backward.

Further, in the present embodiment, as illustrated in FIG. 5, projecting section 2a and projecting section 2b are connected by concave curved surface CS forming an arc. This makes a space between projecting section 2a and projecting section 2b smooth and makes it difficult for dirt to remain on track shoe plate 1.

Second Embodiment

Next, a structure of a track shoe plate used in a track-type work machine according to a second embodiment of the present disclosure will be described with reference to FIGS. 9 to 12.

Figure 9:
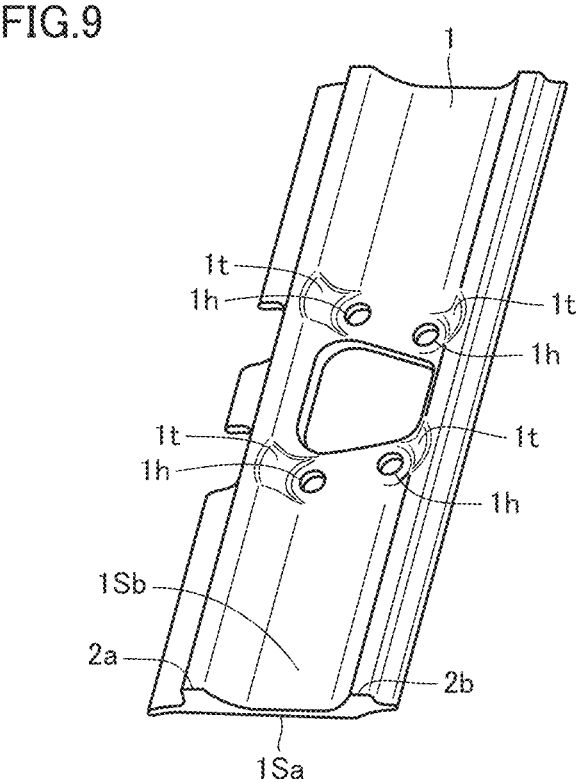
FIG. 9 is a perspective view of a structure of a track shoe plate used in a track-type work machine according to a second embodiment of the present disclosure.
Figure 10:
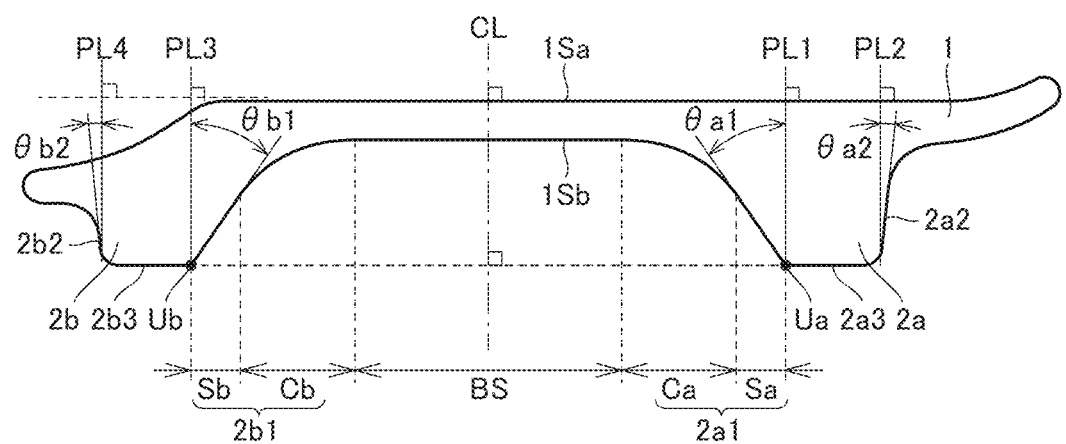
FIG. 10 is a side view of the structure of the track shoe plate illustrated in FIG. 9.
Figure 11:
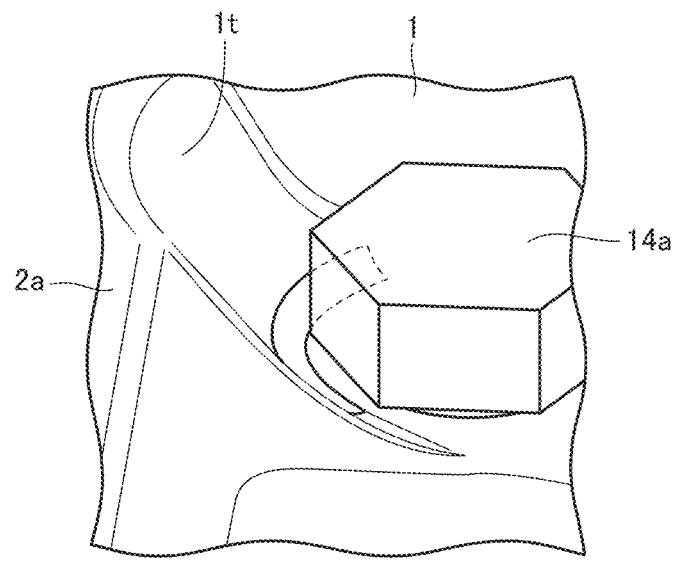
FIG. 11 is a partially enlarged perspective view of a structure including the track shoe plate illustrated in FIG. 9 and a bolt member.
Figure 12:
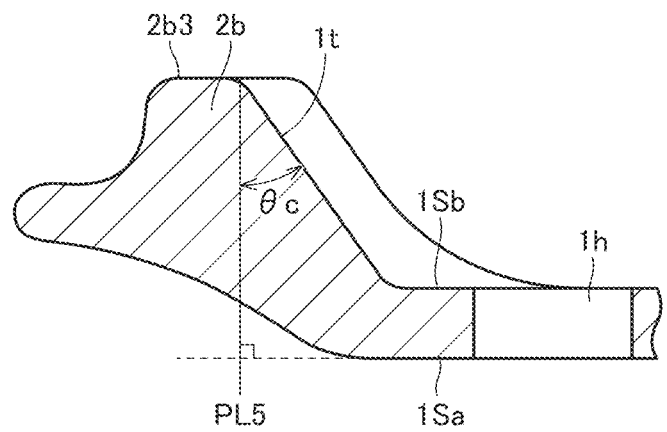
FIG. 12 is a partial cross-sectional view of a structure around a section where the bolt member is attached to the track shoe plate illustrated in FIG. 9.

FIG. 9 is a perspective view of a structure of the track shoe plate used in the track-type work machine according to the second embodiment of the present disclosure. FIG. 10 is a side view of the structure of the track shoe plate illustrated in FIG. 9. FIG. 11 is a partially enlarged perspective view of a structure including the track shoe plate illustrated in FIG. 9 and a bolt member. FIG. 12 is a partial cross-sectional view of a structure around a section where the bolt member is attached to the track shoe plate illustrated in FIG. 9.

As illustrated in FIG. 9, track shoe plate 1 according to the present embodiment is different from track shoe plate 1 according to the first embodiment in the structure of side surface 2a1 of projecting section 2a, the structure of side surface 2b1 of projecting section 2b, the structure between side surface 2a1 and side surface 2b1, and the structure of depression 1t.

As illustrated in FIG. 10, side surface 2a1 of projecting section 2a has a straight inclined surface Sa and a curved inclined surface Ca. Straight inclined surface Sa extends linearly from distal end edge Ua of projecting section 2a toward attachment surface 1Sa in the side view.

Curved inclined surface Ca is connected to an end, closer to attachment surface 1Sa, of straight inclined surface Sa. Curved inclined surface Ca extends in a curved shape (arc shape) from the connection point with straight inclined surface Sa toward attachment surface 1Sa. Curved inclined surface Ca has a curved surface concave toward attachment surface 1Sa.

Straight inclined surface Sa is inclined relative to perpendicular line PL1. Inclination angle $\theta a1$ of straight inclined surface Sa relative to perpendicular line PL1 is greater than inclination angle $\theta a2$ of side surface 2a2 relative to perpendicular line PL2. Inclination angle $\theta a1$ is greater than winding angle $\alpha$ of track shoe plate 1 relative to either sprocket 21 or idler 22.

An inclination angle of curved inclined surface Ca relative to perpendicular line PL1 at the connection point with straight inclined surface Sa is greater than inclination angle $\theta a1$.

Side surface 2b1 of projecting section 2b has a straight inclined surface Sb and a curved inclined surface Cb. Straight inclined surface Sb extends linearly from distal end edge Ub of projecting section 2b toward attachment surface 1Sa in the side view.

Curved inclined surface Cb is connected to an end, closer to attachment surface 1Sa, of straight inclined surface Sb. Curved inclined surface Cb extends in a curved shape (arc shape) from the connection point with straight inclined surface Sb toward attachment surface 1Sa. Curved inclined surface Cb has a curved surface concave toward attachment surface 1Sa.

Straight inclined surface Sb is inclined relative to perpendicular line PL3. Inclination angle $\theta b1$ of straight inclined surface Sb relative to perpendicular line PL3 is greater than inclination angle $\theta b2$ of side surface 2b2 relative to perpendicular line PL4. Inclination angle $\theta b1$ is greater than winding angle $\alpha$ of track shoe plate 1 relative to either sprocket 21 or idler 22.

An inclination angle of curved inclined surface Cb relative to perpendicular line PL3 at the connection point with straight inclined surface Sb is greater than inclination angle $\theta b1$.

Curved inclined surface Ca and curved inclined surface Cb are connected by a flat surface BS. Flat surface BS is a flat surface extending from curved inclined surface Ca to curved inclined surface Cb. Flat surface BS is approximately parallel to the flat surface of attachment surface 1Sa.

As illustrated in FIG. 9, track shoe plate 1 has depression 1t. Depression 1t is provided in each of projecting sections 2a, 2b. Depression 1t is formed by making projecting sections 2a, 2b around a part of through hole 1h depressed.

As illustrated in FIG. 11, depression 1t prevents the head of bolt member 14a inserted into through hole 1h from interfering with projecting section 2a or projecting section 2b. A gap is provided between depression 1t and the head of bolt member 14a.

As illustrated in FIG. 12, in a side cross-sectional view, a wall surface of depression 1t is inclined relative to a perpendicular line PL5 perpendicular to the flat surface of attachment surface 1Sa of track shoe plate 1. Depression 1t provided in projecting section 2b is inclined so as to be closer to projecting section 2a while extending from distal end surface 2b3 of projecting section 2b toward attachment surface 1Sa. Further, depression 1t provided in projecting section 2a is inclined so as to be closer to projecting section 2b while extending from distal end surface 2a3 of projecting section 2a toward attachment surface 1Sa. An inclination angle $\theta c$ of the wall surface of depression 1t relative to perpendicular line PL5 is greater than winding angle $\alpha$ of track shoe plate 1 relative to either sprocket 21 or idler 22. An inclination angle of the wall surface of depression 1t provided in projecting section 2a is also greater than winding angle $\alpha$ of track shoe plate 1 relative to either sprocket 21 or idler 22.

Note that the structure of track shoe plate 1 according to the present embodiment other than the above is approximately the same as the structure of track shoe plate 1 according to the first embodiment, so that the same components are denoted by the same reference numerals to avoid the description from being redundant.

The present embodiment can produce the same effects as the effects of the first embodiment.

In the present embodiment, side surface 2a1 of projecting section 2a is formed by a combination of straight inclined surface Sa and curved inclined surface Ca, so that the amount of the material used for track shoe plate 1 can be reduced as compared with track shoe plate 1 according to the first embodiment.

Further, in the present embodiment, side surface 2b1 of projecting section 2b is formed by a combination of straight inclined surface Sb and curved inclined surface Cb, so that the amount of the material used for track shoe plate 1 can be reduced as compared with track shoe plate 1 according to the first embodiment.

Further, in the present embodiment, as illustrated in FIG. 12, depression 1t is provided in each of projecting sections 2a, 2b. This makes it difficult for dirt to remain in a space between bolt member 14a and projecting sections 2a, 2b. This will be described below with reference to FIGS. 13 and 14.

Figure 13:
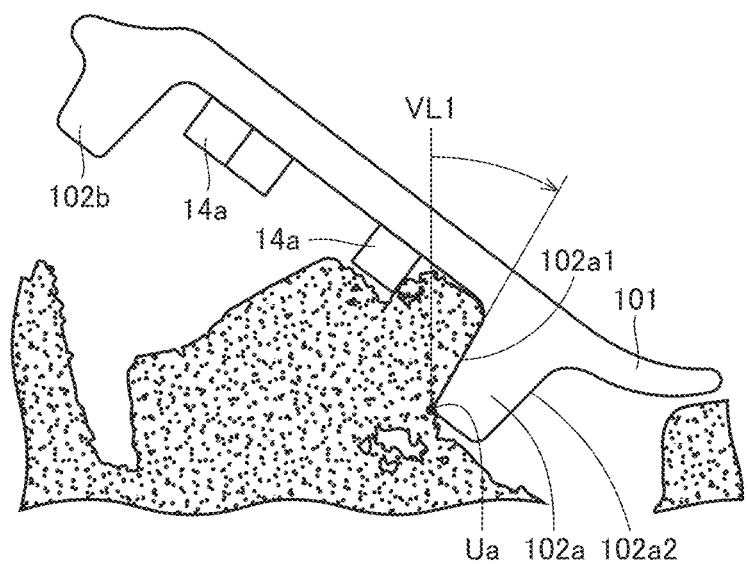
FIG. 13 is a side view of a track shoe plate according to a comparative example, for describing how easy it is for dirt to adhere to the track shoe plate.
Figure 14:
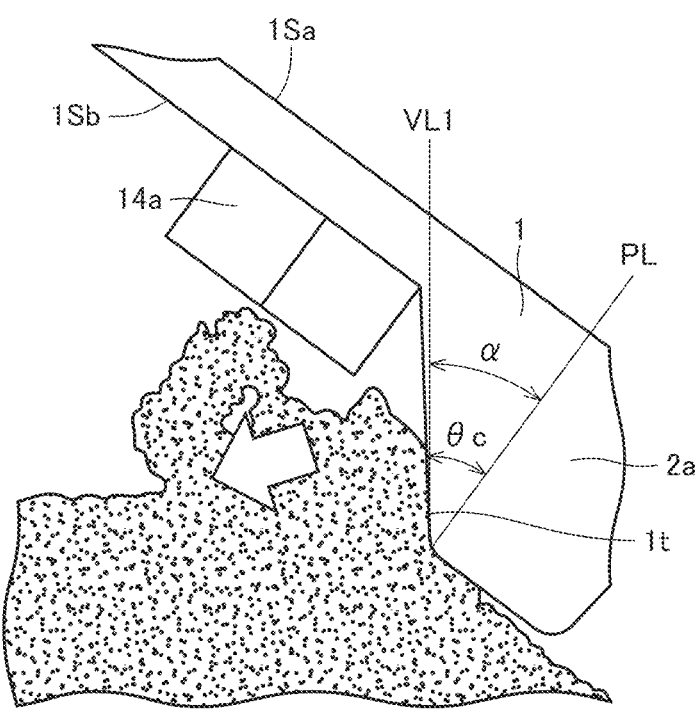
FIG. 14 is a side view of the track shoe plate illustrated in FIG. 9, for describing how difficult it is for dirt to adhere to the track shoe plate.

FIG. 13 is a side view of a track shoe plate according to a comparative example, for describing how easy it is for dirt to adhere to the track shoe plate. FIG. 14 is a side view of the track shoe plate illustrated in FIG. 9, for describing how difficult it is for dirt to adhere to the track shoe plate. Track shoe plate 101 according to the comparative example illustrated in FIG. 13 is the same as track shoe plate 1 illustrated in FIG. 7, and dirt tends to remain on track shoe plate 101. Furthermore, dirt tends to remain in the gap between projecting section 2a or projecting section 2b and the head of bolt member 14a.

On the other hand, in the present embodiment, as illustrated in FIG. 14, the wall surface of depression 1t is inclined relative to straight line VL1 (for example, a vertical line) so as to be closer to projecting section 2b while extending toward attachment surface 1Sa. This prevents the other sections of track shoe plate 1 from being positioned vertically below the wall surface of depression 1t. This makes it easy for dirt to separate from the gap between projecting section 2a or projecting section 2b and the head of bolt member 14a and makes it difficult for dirt to remain on track shoe plate 1.

Third Embodiment

Next, a structure of a track shoe plate used in a track-type work machine according to a third embodiment of the present disclosure will be described with reference to FIGS. 15 to 16.

Figure 15:
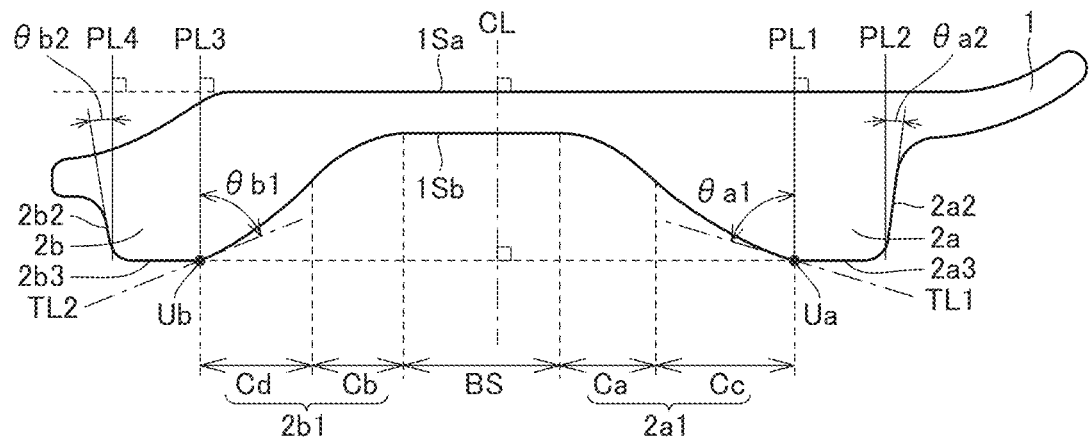
FIG. 15 is a side view of a structure of a track shoe plate used in a track-type work machine according to a third embodiment of the present disclosure.

FIG. 15 is a side view of the structure of the track shoe plate used in the track-type work machine according to the third embodiment of the present disclosure. FIG. 16 is a side view of a structure where the track shoe plate illustrated in FIG. 15 is attached to a crawler belt link.

As illustrated in FIG. 15, track shoe plate 1 according to the present embodiment is different from track shoe plate 1 according to the second embodiment in the structure of side surface 2a1 of projecting section 2a, and the structure of side surface 2b1 of projecting section 2b.

In the present embodiment, side surface 2a1 of projecting section 2a has a curved inclined surface Cc and curved inclined surface Ca. Curved inclined surface Cc extends in a curved shape (arc shape) from distal end edge Ua of projecting section 2a toward attachment surface 1Sa in the side view. Curved inclined surface Cc has a surface curved outward away from attachment surface 1Sa. Curved inclined surface Cc is curved outward away from attachment surface 1Sa in the side view.

Curved inclined surface Cc is inclined relative to perpendicular line PL1. Inclination angle $\theta a1$ of straight inclined surface Sa relative to perpendicular line PL1 is greater than inclination angle $\theta a2$ of side surface 2a2 relative to perpendicular line PL2 perpendicular to attachment surface 1Sa. Inclination angle $\theta a1$ is an angle formed by a tangent line TL1 tangent to curved inclined surface Cc and perpendicular line PL1 at distal end edge Ua. Inclination angle $\theta a1$ is greater than winding angle $\alpha$ of track shoe plate 1 relative to either sprocket 21 or idler 22.

Side surface 2b1 of projecting section 2b has a curved inclined surface Cd and curved inclined surface Cb. Curved inclined surface Cd extends in a curved shape (arc shape) from distal end edge Ub of projecting section 2b toward attachment surface 1Sa in the side view. Curved inclined surface Cd has a surface curved outward away from attachment surface 1Sa. Curved inclined surface Cd is curved outward away from attachment surface 1Sa in the side view.

Curved inclined surface Cd is inclined relative to perpendicular line PL3. Inclination angle $\theta b1$ of straight inclined surface Sb relative to perpendicular line PL3 is greater than inclination angle $\theta b2$ of side surface 2b2 relative to perpendicular line PL4 perpendicular to attachment surface 1Sa. Inclination angle $\theta b1$ is an angle formed by a tangent line TL2 tangent to curved inclined surface Cd and perpendicular line PL3 at distal end edge Ub. Inclination angle $\theta b1$ is greater than winding angle $\alpha$ of track shoe plate 1 relative to either sprocket 21 or idler 22.

Figure 16:
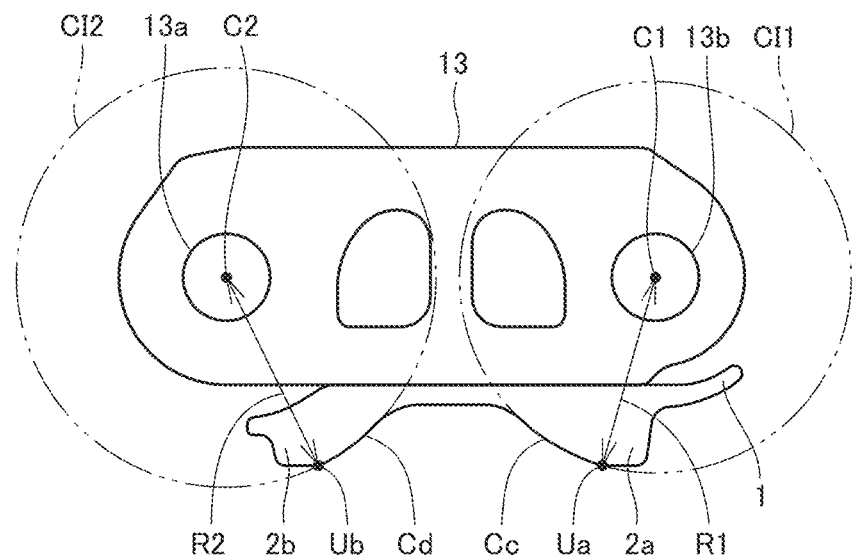
FIG. 16 is a side view of a structure where the track shoe plate illustrated in FIG. 15 is attached to a crawler belt link.

As illustrated in FIG. 16, with track shoe plate 1 attached to crawler belt link 13, the curve (arc) of curved inclined surface Cc is centered around a center C1 of pin hole 13b and is an arc of a circle CI1 (long dashed double-dotted line) passing through distal end edge Ua in the side view. Therefore, in the side view, curved inclined surface Cc is an arc having a radius of curvature equal to a radius R1 of circle CI1. Further, the curve (arc) of curved inclined surface Cd is centered around a center C2 of bushing hole 13a and is an arc of a circle CI2 (long dashed double-dotted line) passing through distal end edge Ub in the side view. Therefore, in the side view, curved inclined surface Cd is an arc having a radius of curvature equal to a radius R2 of circle CI2.

As illustrated in FIG. 15, inclination angle $\theta a1$ is preferably less than or equal to the angle formed by tangent line TL1 tangent to circle CI1 (FIG. 16) and perpendicular line PL1 at distal end edge Ua. Further, inclination angle $\theta b1$ is preferably less than or equal to the angle formed by tangent line TL2 tangent to circle CI2 (FIG. 16) and perpendicular line PL3 at distal end edge Ub.

Note that the structure of track shoe plate 1 according to the present embodiment other than the above is approximately the same as the structure of track shoe plate 1 according to the second embodiment, so that the same components are denoted by the same reference numerals to avoid the description from being redundant.

The present embodiment can produce the same structure as the structure of the first embodiment.

Further, in the present embodiment, as illustrated in FIG. 15, inclination angle $\theta a1$ is less than or equal to the angle formed by tangent line TL1 tangent to circle CI1 and perpendicular line PL1 at distal end edge Ua. This makes it easy for dirt to separate from track shoe plate 1, allows a required height of projecting section 2a to be secured, and can prevent the weight of track shoe plate 1 from excessively increasing.

Inclination angle $\theta b1$ is less than or equal to the angle formed by tangent line TL2 tangent to circle CI2 and perpendicular line PL3 at distal end edge Ub. This also makes it easy for dirt to separate from track shoe plate 1, allows a required height of projecting section 2b to be secured, and can prevent the weight of track shoe plate 1 from excessively increasing.

Note that, in each of the above-described first to third embodiments, when projecting section 2a corresponds to a "first projecting section" in the claims, projecting section 2b corresponds to a "second projecting section" in the claims, side surface 2a1 corresponds to a "first side surface" or "side surface closer to the second projecting section" in the claims, and side surface 2b1 corresponds to a "second side surface" in the claims. Further, in each of the above-described first to third embodiments, when projecting section 2b corresponds to the "first projecting section" in the claims, projecting section 2a corresponds to the "second projecting section" in the claims, side surface 2b1 corresponds to the "first side surface" or "side surface closer to the second projecting section" in the claims, and side surface 2a1 corresponds to the "second side surface" in the claims.

Further, in the second embodiment, when projecting section 2a corresponds to the "projecting section" in the claims, side surface 2a1 corresponds to the "first side surface" in the claims, and side surface 2a2 corresponds to the "second side surface" in the claims. Further, in the second embodiment, when projecting section 2b corresponds to the "projecting section" in the claims, side surface 2b1 corresponds to the "first side surface" in the claims, and side surface 2b2 corresponds to the "second side surface" in the claims.

It should be understood that the embodiments disclosed herein are illustrative in all respects and not restrictive. The scope of the present invention is defined by the claims rather than the above description, and the present invention is intended to include the claims, equivalents of the claims, and all modifications within the scope.

REFERENCE SIGNS LIST 1, 1A, 1B: track shoe plate, 1Sa: attachment surface, 1Sb: ground engaging surface, 1h, 13h: through hole, 1t: depression, 2a, 2b: projecting section, 2a1, 2a2, 2b1, 2b2: side surface, 2a3, 2b3: distal end surface, 10: crawler belt, 11: bushing, 12: coupling pin, 13: crawler belt link, 13a: bushing hole, 13b: pin hole, 14a: bolt member, 14b: nut member, 15: seal member, 20: traveling unit, 21: sprocket, 22: idler, 23: bottom roller, 24: top roller, 25: track frame, 26: turning apparatus, 30: track-type work machine, 31: turning body, 31a: cab, 31b: engine compartment, 31c: counterweight, 32: work implement, BS: flat surface, Ca, Cb, Cc, Cd: curved inclined surface, GL: ground, Ra: partial region, Sa, Sb: straight inclined surface, Ua, Ub: distal end edge

The invention claimed is:

1. A traveling unit comprising:
a driving wheel;
an idler wheel; and
a crawler belt wound around the driving wheel and the idler wheel and including a plurality of track shoe plates,
wherein the track shoe plates each have a first surface and a second surface located on a side opposite to the driving wheel and the idler wheel relative to the first surface,
the track shoe plates each have a first projecting section on the second surface,
a first side surface of the first projecting section is inclined relative to a perpendicular line perpendicular to the first surface at an angle greater than a winding angle of the track shoe plates relative to either the driving wheel or the idler wheel,
the track shoe plates each have a through hole,
the first side surface of the first projecting section has a depression depressed around the through hole, and
a wall surface of the depression extends from the distal end of the first projecting section toward the first surface and is inclined from the perpendicular line perpendicular to the first surface at an angle greater than the winding angle of the track shoe plates.

2. The traveling unit according to claim 1, wherein
the track shoe plates each have a second projecting section on the second surface, and
a second side surface of the second projecting section facing the first side surface of the first projecting section is inclined relative to the perpendicular line perpendicular to the first surface at an angle greater than the winding angle of the track shoe plates relative to either the driving wheel or the idler wheel.

3. The traveling unit according to claim 2, wherein the first projecting section and the second projecting section are connected by a concave curve forming an arc.

4. The traveling unit according to claim 1, wherein the first side surface of the first projecting section has a first inclined surface extending linearly from a distal end of the first projecting section toward the first surface, and a second inclined surface connected to the first inclined surface and extending in a curved shape toward the first surface.

5. The traveling unit according to claim 1, wherein the first side surface of the first projecting section has a convex curve forming an arc and extending from a distal end of the first projecting section toward the first surface.

6. A work machine comprising:
the traveling unit according to claim 1; and
a machine main body supported by the traveling unit.

7. A track shoe plate comprising:
a first surface; and
a second surface located on a side opposite to the first surface, and having a projecting section,
wherein the projecting section has a first side surface and a second side surface located on a side opposite to the first side surface,
the first side surface is inclined relative to a perpendicular line perpendicular to the first surface more than the second side surface,
the first side surface has a first inclined surface extending linearly and a second inclined surface connected to an end, closer to the first surface, of the first inclined surface and extending in a curved shape in a side view,
the track shoe plates each have a through hole,
the first side surface of the first projecting section has a depression depressed around the through hole, and
a wall surface of the depression extends from the distal end of the first projecting section toward the first surface and is inclined from the perpendicular line perpendicular to the first surface at an angle greater than the winding angle of the track shoe plates.

8. A crawler belt comprising:
the track shoe plate according to claim 7; and
a crawler belt link attached to the track shoe plate.

9. A track shoe plate included in a crawler belt that is wound around a driving wheel and an idler wheel of a traveling unit, comprising:
a first surface; and
a second surface located on a side opposite to the first surface,
wherein the second surface has a first projecting section and a second projecting section,
the first projecting section and the second projecting section are separated from each other and aligned with each other in a travel direction of the crawler belt when the traveling unit travels, and
a side surface, closer to the second projecting section, of the first projecting section has a curve extending from a distal end of the first projecting section toward the first surface in a side view, the curve being curved outward away from the first surface.

10. A crawler belt comprising:
the track shoe plate according to claim 9; and
a crawler belt link attached to the track shoe plate.

* * * * *